JEROME J. MUNGER, OF SYRACUSE, NEW YORK.

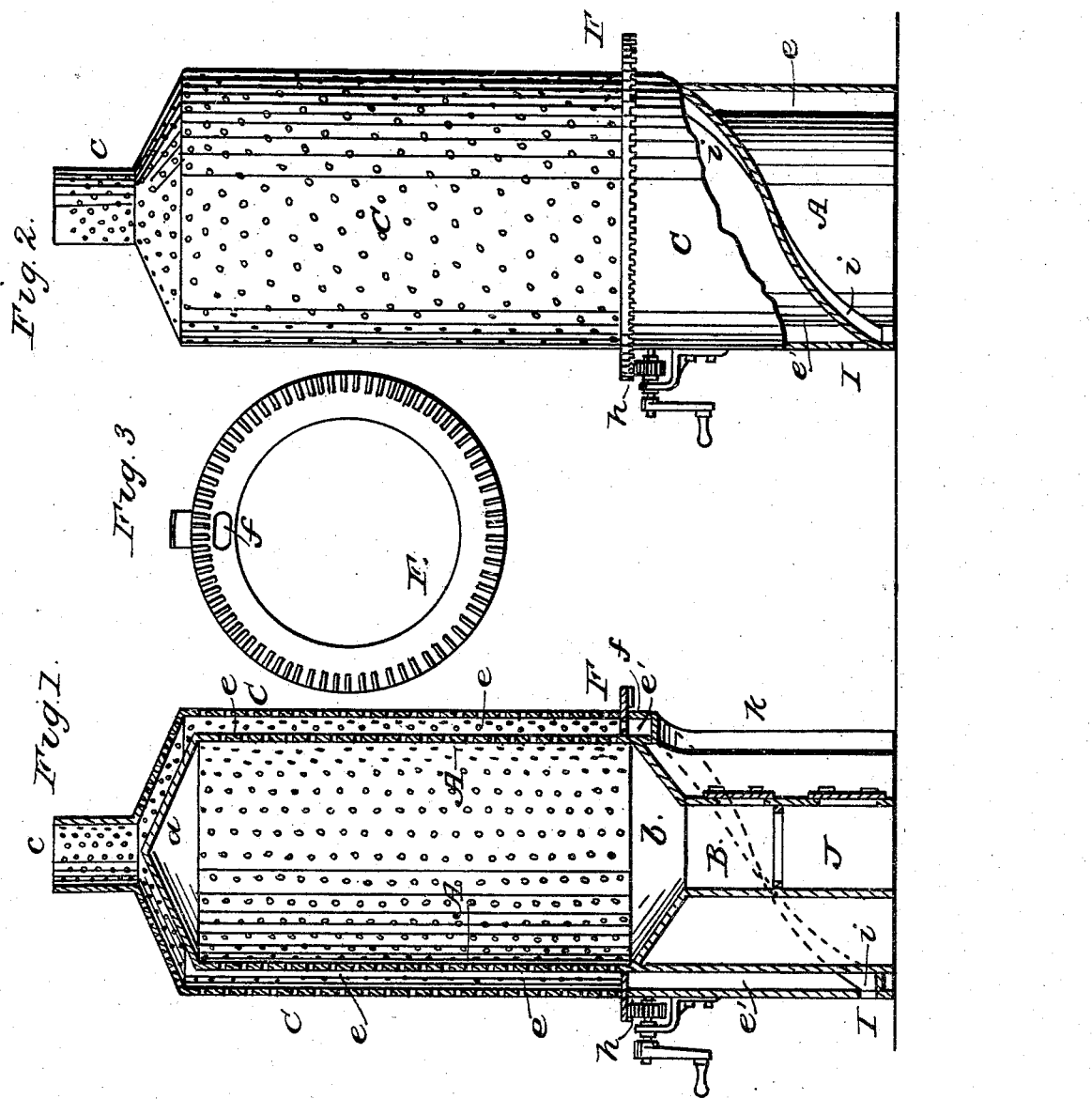

Letters Patent No. 86,436, dated February 2, 1869.

IMPROVEMENT IN GRAIN-DRIERS.

The Schedule referred to in these Letters Patent and making part of the same.

*To all whom it may concern:*

Be it known that I, JEROME J. MUNGER, of Syracuse, in the county of Onondaga, and State of New York, have invented a new and useful Improvement in Grain-Driers; and I do hereby declare that the following is a full, clear, and exact description thereof, which will enable those skilled in the art to make and use the same, reference being had to the accompanying drawings, forming part of this specification, in which—

Figure 1 is a central vertical section of my invention, and

Figure 2 is a side elevation of the same, with the outer wall or shell broken away near its foot.

Figure 3 shows a bottom view of the discharging-ring.

Similar letters of reference indicate corresponding parts in all the figures.

This invention relates to new and useful improvements in grain-driers, whereby an economical and efficient apparatus is obtained, as hereinafter explained.

In the accompanying drawings—

A is an inner wall, which is closed at its top by a cover, a, and is perforated from the top down as far as the furnace b B.

C is a perforated outer wall or shell, and has a spout, c, at its top, for receiving the grain.

F is a flat ring, which serves as a floor for the drying-chamber e e, fig. 1, and has an opening, f, for discharging the grain from the chamber e.

This ring is provided with cogs on its lower face, and is rotated by means of a pinion, h, so that the opening, f, may be constantly rotated underneath the grain in the annular drying-chamber e, and the grain drawn evenly from all sides of said chamber.

The discharging-ring F may be supported on anti-friction rollers, so as to run with the least amount of resistance, if desired.

The inner and outer walls A C extend downward below the discharging-ring F, and form an annular chamber, e', below said ring; and in this annular chamber is placed an inclined floor, i, so that all grain discharged through the ring is collected to one side, at the delivering-spout I, by sliding down the inclined floor or chute i of the annular chamber e'.

The lower part of the inner wall or cylinder A is occupied by a furnace, B, having an ash-pit, J, and a flaring conical top, b.

k is an arch or door-way through the walls A C, giving access to the furnace.

Its operation is as follows:

A fire is lighted in the furnace B, and is supplied with a smokeless fuel, like anthracite coal or coke, and grain is then run into the spout c until the annular drying-chamber e e is filled. The ring F is soon set in motion, and is kept constantly revolving, and withdrawing grain from all parts of the floor of the chamber as the said ring revolves and carries the discharging-orifice f around underneath the grain.

The orifice f of the ring F is provided with a sliding gate, g, fig. 3, for closing said orifice f, or for regulating its discharging-capacity, as desired. By this method of withdrawing the grain from chamber e, the action is made very even and regular, the agitation being the same in all parts of the chamber, and the grain passing through on all sides of the chamber with a uniform velocity.

The heated air from the furnace passes up and is diffused throughout the chamber A A a, and, passing through the perforations in wall A, goes through the grain in chamber e e, and, taking moisture from the grain, escapes through the perforations in the out wall C C. By these means, I produce a drier for grain which is efficient and economical in its action, and is also simple in its construction, and not liable to get out of order.

Having thus described my invention,

What I claim as new, and desire to secure by Letters Patent, is—

The annular chamber e e, the inner and outer walls of which are perforated, the revolving discharging-ring F f, and annular helical chute i, passing through the lower part e' of the chamber e, in connection with the furnace B, all constructed and arranged substantially as and for the purpose specified.

JEROME J. MUNGER.

Witnesses:
Z. CHAS. FOOT,
ALEX'R A. C. KLAUCKE.